United States Patent [19]

Luzzi

[11] Patent Number: 5,467,515
[45] Date of Patent: Nov. 21, 1995

[54] ALTERNATIVE COLD SHRINK DEVICE

[75] Inventor: Glenn J. Luzzi, Mt. Bethel, Pa.

[73] Assignee: Amerace Corporation, Hackettstown, N.J.

[21] Appl. No.: 313,778

[22] Filed: Sep. 28, 1994

[51] Int. Cl.$^6$ .................................................. B23P 19/02
[52] U.S. Cl. .................................................. 29/235
[58] Field of Search .............................. 29/450, 451, 235, 29/283.5; 254/29 A; 174/135, 138 F

[56] References Cited

U.S. PATENT DOCUMENTS

| | | |
|---|---|---|
| 1,669,053 | 5/1928 | Hamel . |
| 3,515,798 | 6/1970 | Sievert . |
| 3,801,067 | 4/1974 | Shorter .................................. 254/29 A |
| 3,824,331 | 7/1974 | Lenhart et al. . |
| 3,946,480 | 3/1976 | Dienes . |
| 4,267,628 | 5/1981 | Izraeli . |
| 4,291,454 | 9/1981 | Sawaryn .................................. 29/450 |
| 4,757,588 | 7/1988 | Churchich .................................. 29/235 |

Primary Examiner—Robert C. Watson
Attorney, Agent, or Firm—David Teschner

[57] ABSTRACT

A mandrel having a tapered surface expanding from a first dimension at a first end to a larger dimension at its second, and having a central bore larger than the diameter of a high voltage cable, is forced into the bore of a premolded or extruded high voltage component to expand, at least a portion of such bore to the diameters of such mandrel. A locking device is fixed to the component to retain the mandrel in place and retain the premolded or extruded component in its expanded state. In use the cable is inserted through the mandrel bore into the cover bore and the locking device released. As the cover returns substantially to its former dimensions, the hoops forces applied to the tapered mandrel force the mandrel out from the cover bore and it may be removed from the cable if desired.

12 Claims, 8 Drawing Sheets

ALTERNATIVE COLD SHRINK DEVICE

BACKGROUND OF THE INVENTION

1. Field of the Invention

The invention is directed to the field of cold shrink parts and the method of their use and more particularly to a device to expand a premolded or extruded part, retain it in its expanded condition on such device until placed over an article at which time the part is released and the part as it returns to its original size ejects the device.

2. Description of the Prior Art

Cold shrink methods are used to expand a premolded or extruded part, such as a connector or cable joint, elbow or extruded sleeve, to a size which permits it to be placed over its mating surface (e.g. a prepared power cable end) without interference. The device used to expand the product is then removed by the user, allowing the premolded or extruded part to recover substantially to its original dimensions.

One well-known device is that shown in U.S. Pat. No. 3,515,798 issued Jun. 2, 1970, used a removable core to support an elastic cover in its expanded state. The core was removed to permit the elastic cover to regain substantially its original dimensions. Because of the hoop forces exerted upon the core by the elastic cover, it was often difficult to remove the entire core. If the core's continuous strip broke at any point, it was difficult, if not impossible, to retrieve the strip and continue to remove the core so that the cover could fully recover.

U.S. Pat. No. 3,824,331 issued Jul. 16, 1974, shows a resilient tubular cover being supported in its stretched condition by a removable one piece support member positioned around the outside of the cover. Once the stretched cover is placed over the joint, for example, the inner support member is first removed and then the cover allowed to recover, after which the outer support member can be removed if desired. Any irregularities in the cable or a distorted cable contour can prevent the inner support member being removed and render the device useless.

In U.S. Pat. No. 4,267,628 issued May 19, 1981, an insulator assembly is placed in a device and the air between the walls of the insulator and the device is removed so that the assembly expands into intimate contact with the interior walls of the device. Once in place air is admitted between the insulator and device to permit the stretched insulator assembly to substantially return to its initial dimensions. The procedure is limited to thin wall insulators and can not operate upon the premolded or extruded products used in high voltage systems.

Hamel, U.S. Pat. No. 1,669,053, issued May 8, 1928, shows a cone-shaped rubber sleeve expansion member pushed along rods to expand a rubber sleeve which is placed over a club handle. The grip end is used to push expansion member along the rods to expand the sleeve and then allow the sleeve to remain on the club handle or grip after the expansion member and rods are removed. The method is used at the point of application and has a limited ability to expand the rubber sleeve and would not work with thick rubber sleeves.

Dines, U.S. Pat. No. 3,946,400 issued Mar. 20, 1976, shows a sleeve expander 10 made of an outermost annulus 22, an intermediate annulus 24 and innermost annulus 26 all joined by support rods or ribs 28. The expanded sleeve (how it is expanded is not disclosed) is placed over a cable 16 and splice 14 which extends through the annuli. Then to collapse the sleeve 12, the activating means 34 is pulled causing innermost annulus 26 to move to the right until it engages intermediate annulus 24 and both are pulled to annulus 22 and the three are removed. The ribs 28 remain in place between the sleeve 12, the cable 16 and the splice 14. The annuli are made in two parts so they can be removed from cable 16 when outside of the sleeve 12. For short coverings two annuli can be used or their number increased for longer coverings. The presence of the ribs 28 within the completed joint can cause undesired electrical or mechanical problems.

SUMMARY OF THE INVENTION

The instant invention overcomes the complexity and difficulty of prior art cold shrink devices and methods of installation by providing a device which can easily expand a premolded or extruded product and which by its shape is ejected from the receiving product.

A tapered mandrel is inserted into the bore of a premolded or extruded product. The mandrel has a throughbore larger than the largest outer diameter of a prepared high voltage cable. When the product bore is expanded to the desired diameter, an external band or harness or other retaining member is placed on the cable and mandrel to prevent removal of the mandrel. Where the product is a cable joint two mandrels are used and one enters from each end of the joint sleeve. The two mandrels can be joined within the bore of the joint sleeve by means of twist or screw locks. For an elbow the screw-in male probe can be used to retain an expansion mandrel within the cable bore. The product in its expanded state is shipped from the factory to the end user. The end user places the product over the end of the prepared cable and removes the retaining member which allows the expanded product to recover substantially its original dimensions due to the elastic memory of the product. In so doing the mandrel is ejected out of the product and can be left on the finished cable or removed. The mandrel may be made in two parts to permit easy removal from the cable. The use of lubricants on the cable, the part and the mandrel greatly assists in the functioning of the instant device. If the product is to be placed over a cable joint, the product is moved along one of the cables beyond the area to be joined. The cable ends are then prepared and joined and then the product is moved over the completed joint and allowed to recover so that the product replaces the insulation that was removed. It is an object of the invention to provide a device for the cold expansion of a premolded or extruded product which device is ejected from the premolded or extruded product when the expanded product is allowed to return to its original size.

It is a further object of the invention to provide a device for the cold expansion of a premolded or extruded product which device has a tapered body which causes such device to be ejected from the premolded or extruded product when the expanded product is allowed to return to its original size.

It is yet another object of the invention to provide a device for the cold expansion of a premolded or extruded product which device is retained in the expanded product to maintain the product in its expanded state and which device has a tapered body which causes such device to be ejected from the product when the expanded product is allowed to return to its original size.

Other objects and features of the invention will be pointed out in the following descriptions and claims and illustrated in the accompanying drawings, which disclose, by way of example, the principles of the invention, and the best modes presently contemplated for carrying them out.

BRIEF DESCRIPTION OF THE DRAWINGS

In the drawings in which similar elements are given similar reference characters.

DESCRIPTION OF THE PREFERRED EMBODIMENTS

Figure 1:
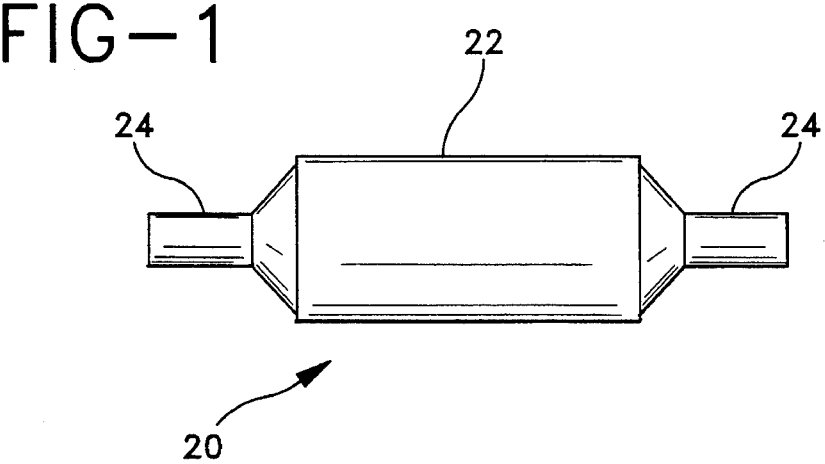
FIG. 1 is a side elevational view of a splice cover for a high voltage cable.
Figure 2:
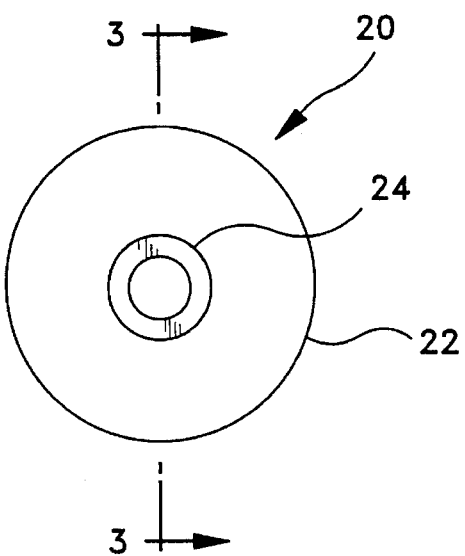
FIG. 2 is an end view of the splice cover of FIG. 1.
Figure 3:
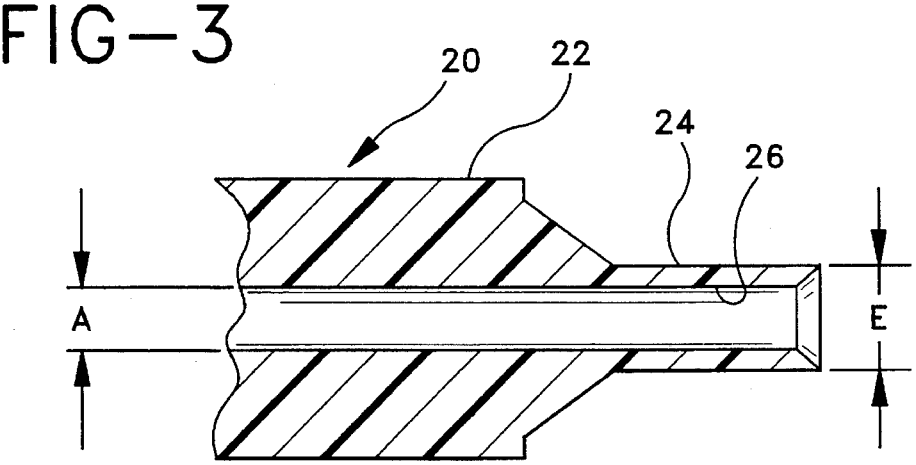
FIG. 3 is a fragmentary side elevational view, in section of the splice cover of FIG. 1.

Turning now to FIGS. 1 to 16, there is shown a mandrel 40 and a method for employing such mandrel 40 according to the concepts of the instant invention. FIGS. 1 and 2 show a splice insulation or cover 20 which has a main body 22 and end sections 24. A uniform bore 26 extends through the end sections 24 and the main body 22 as shown in FIG. 3. Within this bore 26 is placed the metallic splice sleeve (not shown) and the high voltage cable coupled to the splice sleeve (not shown).

Figure 4:
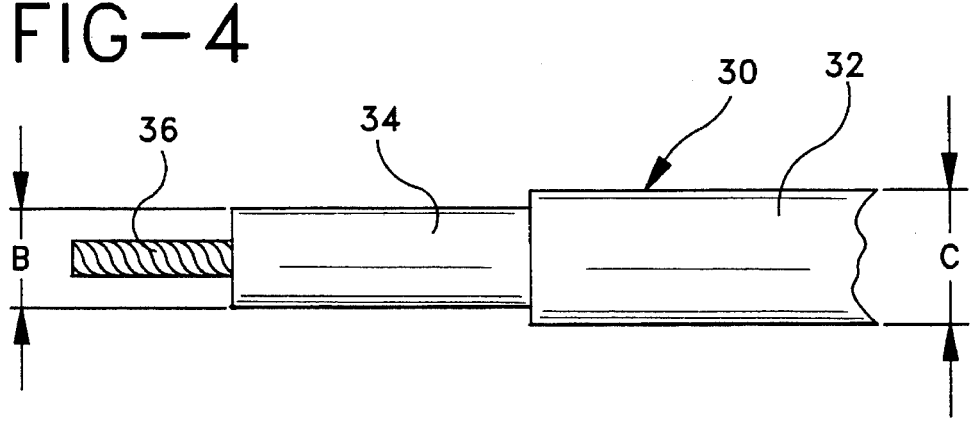
FIG. 4 is a fragmentary side elevation of a prepared high voltage cable end.
Figure 5:
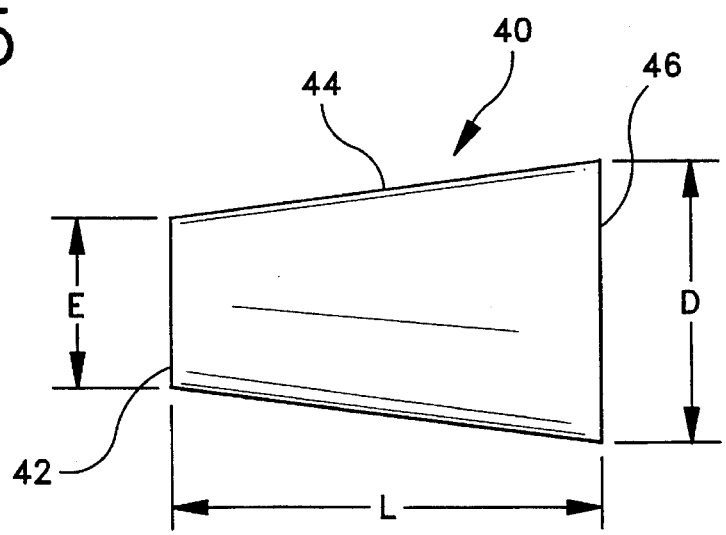
FIG. 5 is a side elevation of a mandrel constructed according to the concepts of the invention.
Figure 6:
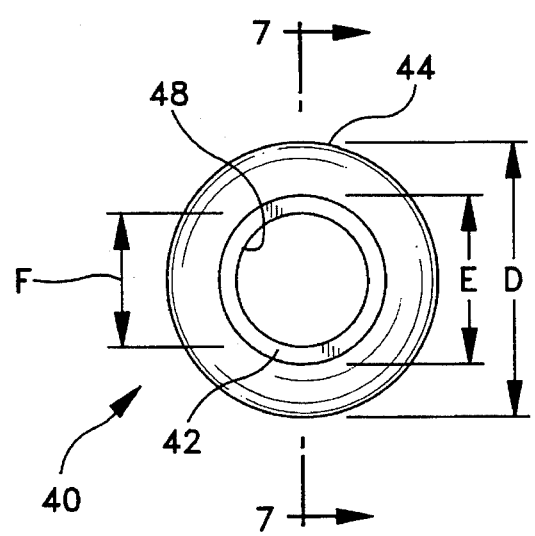
FIG. 6 is an end view of the mandrel of FIG. 5.

FIG. 4 shows a typical high voltage cable 30 having a semi-conductive shield 32, a portion of which has been removed to expose the cable insulation 34 and a portion of the cable insulation 34 has been removed to expose the central conductor 36. The outer diameter of the shield 32 is shown as C in FIG. 4 while the diameter of the insulation layer 34 is B. In the usual case the diameter A of the bore 26, as shown in FIG. 3, is smaller than the diameter B of the cable insulation layer 34. This provides an interference fit between the cable insulation layer 34 and the walls of the cover 20 that define the bore 26 providing the desired electrical performance of the interface. But it is this same interference which makes assembly of the cover 20 to the cable 30 difficult. The resiliency of the cover 20 permits some expansion of the bore 26 and lubricants applied to the cable 30 and bore 26 help in the assembly.

Figure 7:
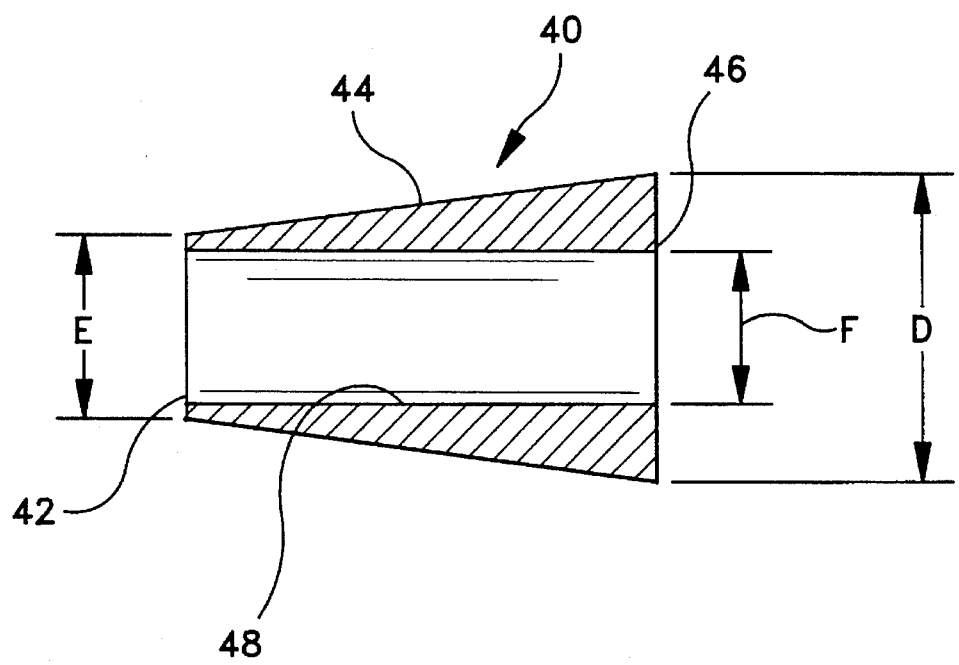
FIG. 7 is a side elevational view, in section, of a first interior construction of the mandrel of FIG. 5.
Figure 8:
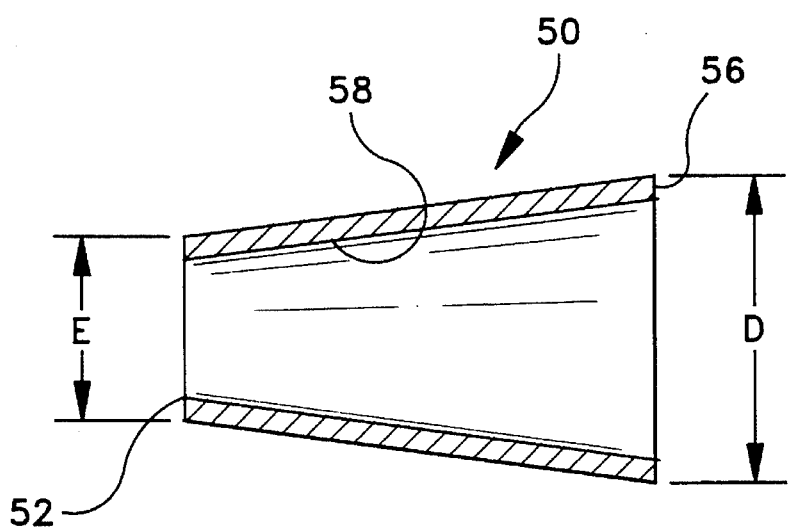
FIG. 8 is a side elevational view in section, of a second interior construction of the mandrel of FIG. 5.

The instant invention provides a mandrel 40 (see FIGS. 5 and 6) having an entry end 42 with an outside diameter E, an upwardly tapered conical outer surface 44 ending in and end 46 having a diameter D. As shown in FIG. 7 a straight-through-bore 48 having a diameter F extends within mandrel 40 from entry end 42 to end 46. The diameter F of the bore 48 is greater than the diameters B of the insulation layer 34 of cable 30 and diameter C of the shield layer 32 of cable 30. Alternatively, a mandrel 50, as shown in FIG. 8 can be used. Mandrel 50 has tapered bore 58 from entry end 52, which has an outer diameter E as does entry end 42 of mandrel 40, to end 56 which has a diameter D as does end 46 of mandrel 40. The outer surface 56 of mandrel 50 has the same taper as outer surface 46 of mandrel 40. Also, although mandrels 40 and 50 are shown as one piece, the mandrel 60 (see FIG. 14) the mandrel 60 is made of two mating halves 70, 72 which permits separation from the cable after ejection from the cover 20 as will be set forth below. Mandrel 60 has entry end 62, tapered outer surface 64 and end 66. The interior bore (not shown) may be a straight bore as 48 in FIG. 7 or a tapered bore as 58 in FIG. 8.

Figure 9:
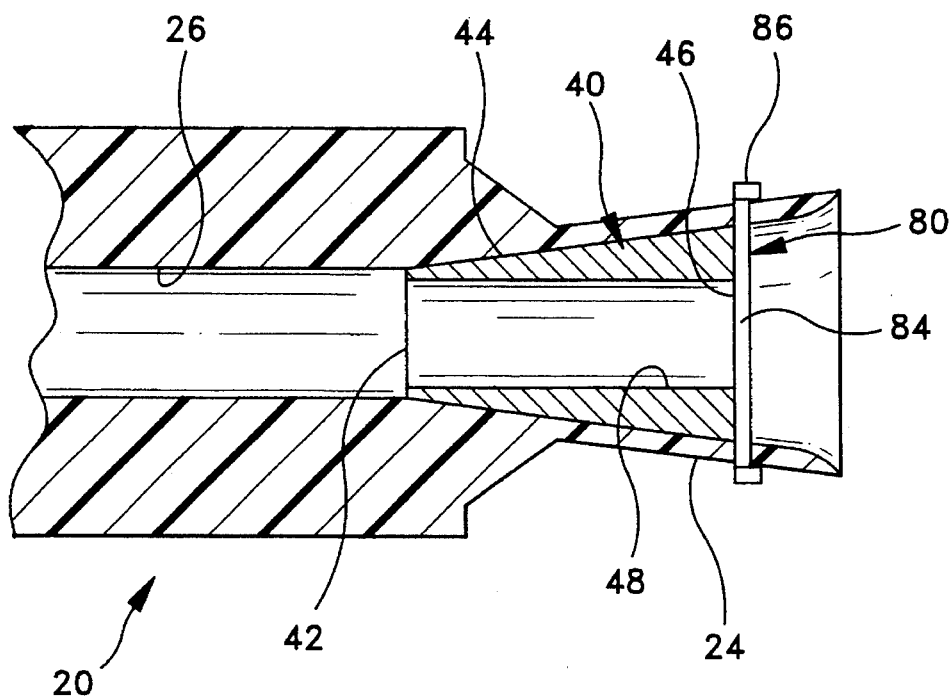
FIG. 9 is a fragmentary side elevation of the mandrel of FIG. 5 inserted into the bore of a splice cover as shown in FIG. 3 and retained in such position.
Figure 10:
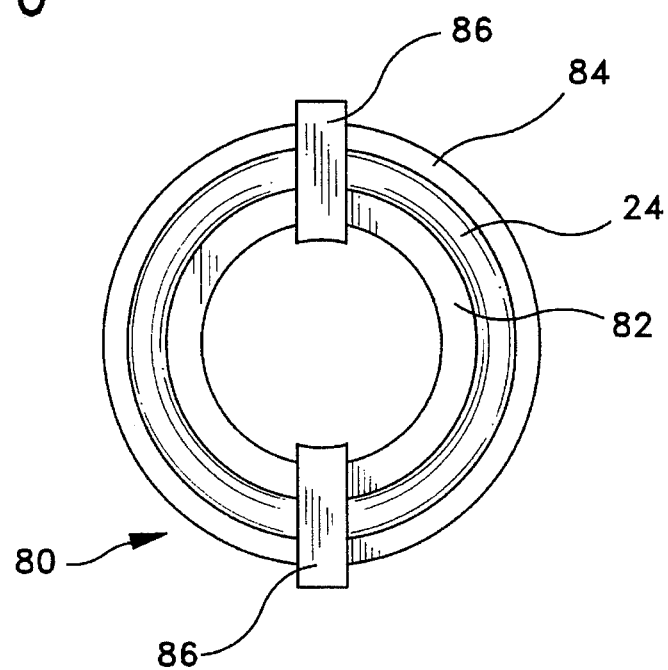
FIG. 10 is an end view of the entrance to the splice cover retained in its expanded state.
Figure 11:
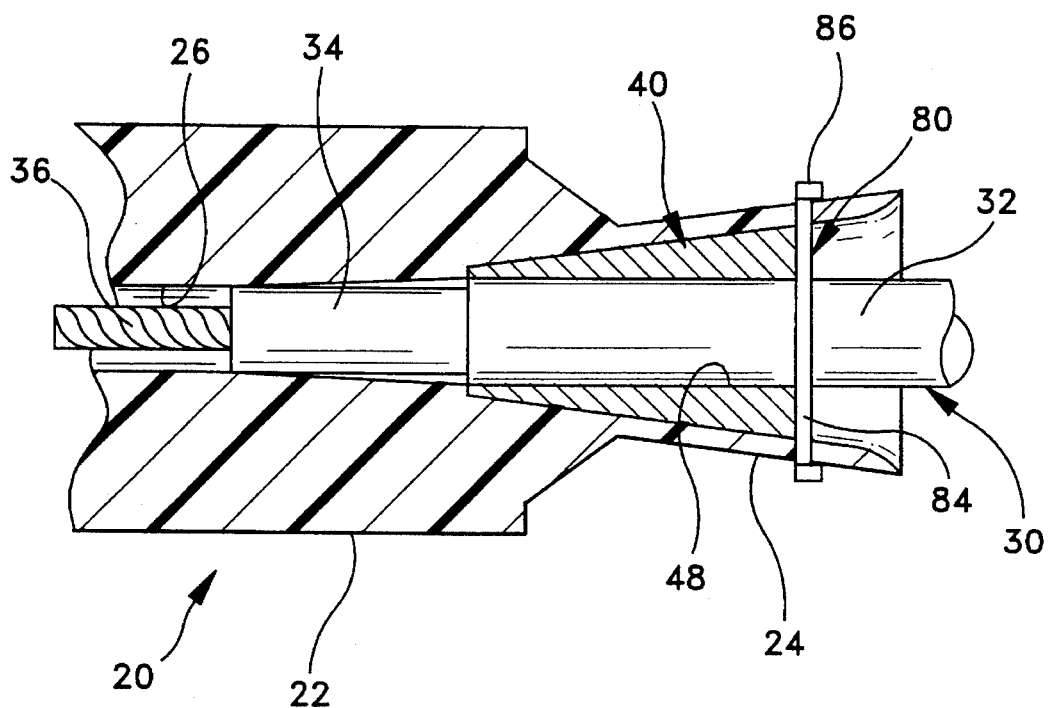
FIG. 11 is a fragmentary side elevation of the expanded cable entrance of the splice cover and mandrel of FIG. 9 with a prepared high voltage cable end as shown in FIG. 4 inserted.
Figure 12:
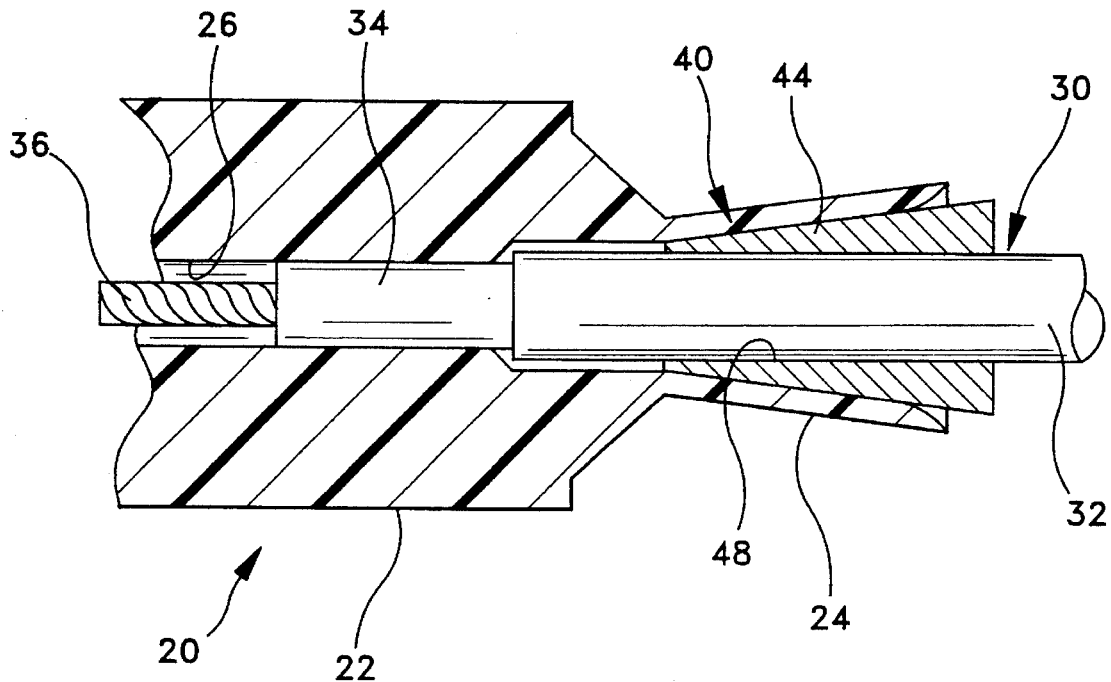
FIG. 12 is the arrangement of FIG. 11 with the retaining means removed and the mandrel being ejected according to the concepts of the invention.

The outer surface 44 of mandrel 40 is lubricated and using factory assembly tools the mandrel 40 is forced into the bore 26 of cover 20 to expand bore 26 from dimension A as shown in FIG. 3 to one which equals diameter E at the entry end 42 of mandrel 40 to one which equals diameter D at the end 46 of mandrel 40 and through at least the length L of mandrel 40 exceeds the diameter F of the bore 48 of mandrel 40. A suitable external band or harness is then applied to retain the mandrel 40 within bore 26 of cover 20. One such arrangement is shown in FIGS. 9 and 10. The device 80 employs an inner band 82 which is placed in the expanded bore 26 in cover end 24 adjacent mandrel end 46. A second band 84 is placed over the cover end 24, also approximately at the location of mandrel end 46. Clamps 86 are connected to bands 82 and 84 to securely grip end 24 between them and prevent their unwanted removal. The other end of the splice cover 20 (not shown) is prepared in the same manner. The splice cover is shipped from the factory in its expanded condition.

To use the splice cover 20, one has merely to prepare his high voltage cable in the manner set forth with respect to FIG. 4. The high voltage cable 30 is inserted through bore 48 of mandrel 40 into bore 26 of cover 20. Once the cable 30 is properly positioned, the device 80 is released by removing clamps 86 and the bands 84 and 82.

Figure 17:
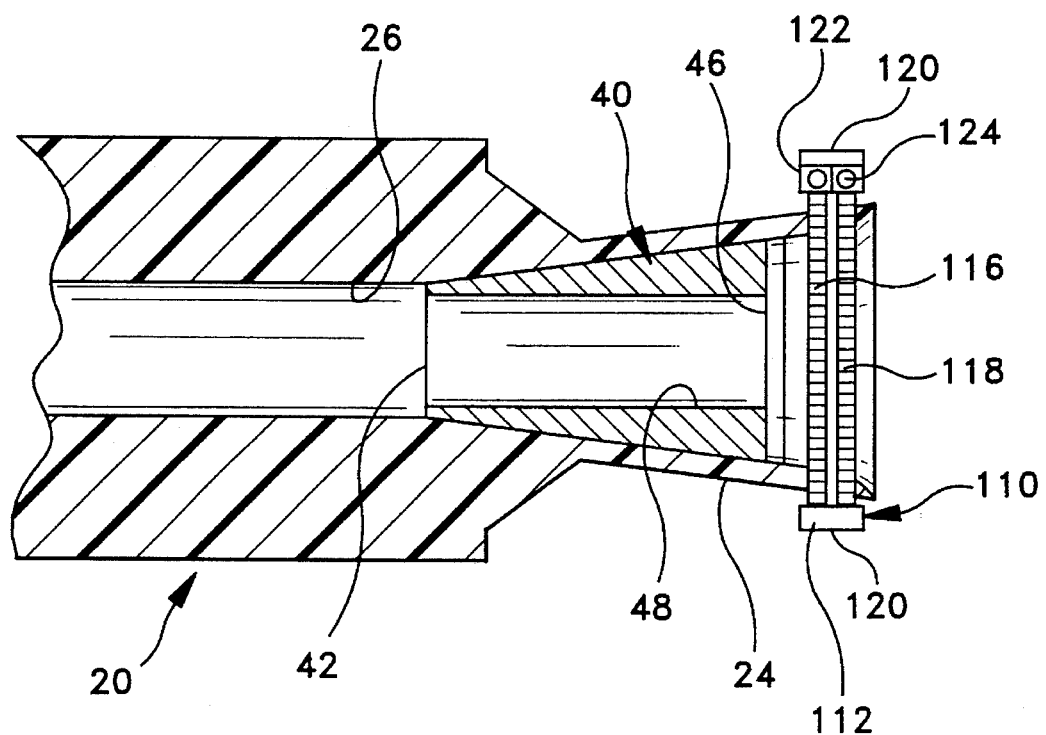
FIG. 17 is a fragmentary, side elevational view, partially in section, showing a harness applied to the end of an expanded cover.

A suitable harness 110 is shown in FIG. 17. A plate 112 having an outside diameter equal to the bore of the expanded cover 20 is placed adjacent end 46 of mandrel 40. A restraining member 114 made up of two hose-type clamps 116 and 118 joined at their ends by blocks 120 to keep the clamps 116 and 118 from separating is applied to end section 24 of the cover 20. The clamps 116 and 118 are tightened by the turning of the bolts 124 in the clamp heads 122 as is well known. The clamps 116 and 118 cause the end section 24 diameter to decrease sufficiently to prevent the ejection of mandrel 40.

Figure 13:
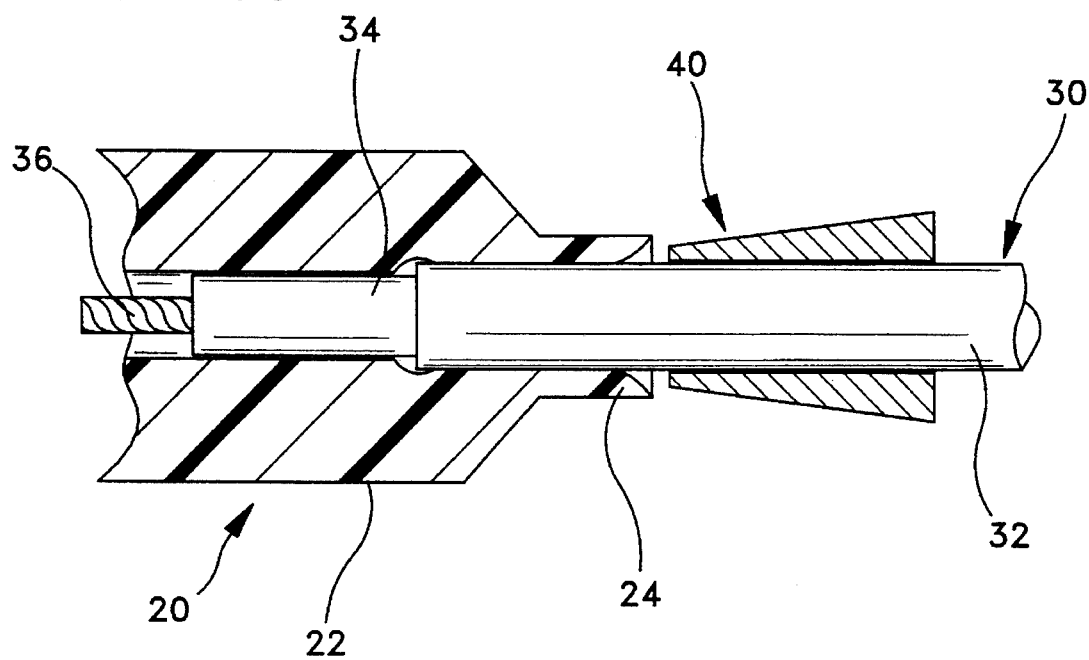
FIG. 13 is the arrangement of FIG. 11 with the mandrel fully ejected.
Figure 14:
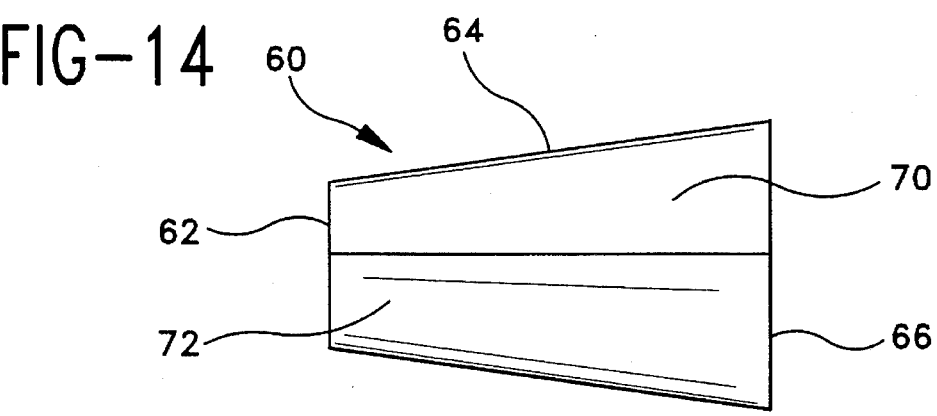
FIG. 14 is a side elevational view of a further construction of the mandrel of FIG. 5.

With cover 20 free of the restraints of device 80, because of its elastic memory, begins to recover towards its original shape and dimensions. As it recovers, the hoop forces applied to mandrel 40 start to extrude mandrel 40 from within ends 24 of cover 20 (see FIG. 12). Because of the taper of surface 44 of mandrel 40 such extrusion of mandrel 40 is greatly assisted. Finally, when the cover has substantially recovered its original shape and size, the mandrel 40 will be fully extruded from the cover 20 as shown in FIG. 13. The mandrel 40 may be left on cable 30 or broken so that it can be totally removed from cable 30. As described above, mandrel 60 is made of two mating parts 70 and 72 which may be removed from cable 30 by separating the halves so that mandrel 60 can be used again. Halves 70, 72 can be locked together during use by external bands or internal locks as is well known in the art. Lubricants can be forced between mandrel surface 44 and bore 26 of the cover 20 to make mandrel removal easier.

Figure 15:
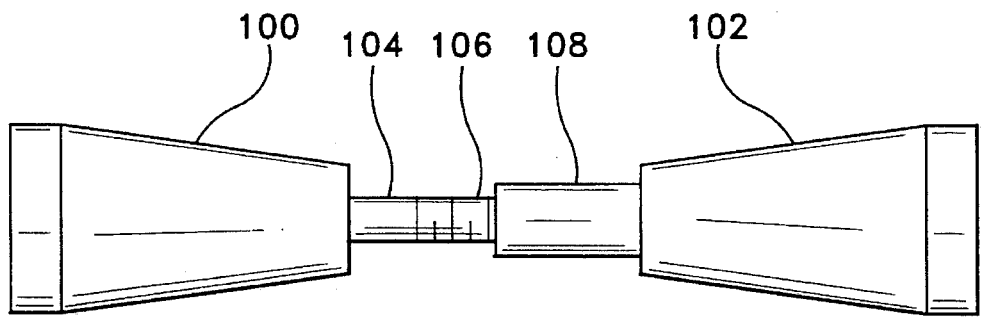
FIG. 15 is a side elevational view of a double mandrel used to expand both ends of a cable joint simultaneously.
Figure 18:
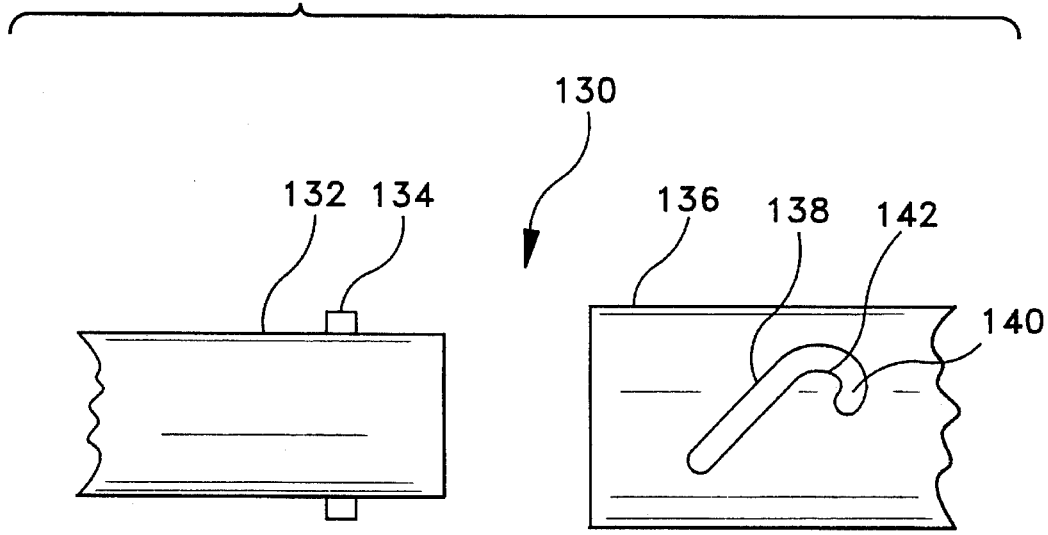
FIG. 18 is a fragmentary side elevational view of a twist-type lock mechanism.

The splice cover 20 can also be prepared using two mandrels 80,82 as shown in FIG. 15. Mandrel 100 has a stud 104 which is externally threaded as at 106 while mandrel 102 has an internally threaded collar 108. The mandrels 100 and 102 are joined by threading externally threaded section 106 of stud 104 into internally threaded collar 108. The mandrels 100, 102 can be removed one at a time or both at the same time. Mandrels 100, 102 can also be joined by a twist lock 130 on the stud 132 and the collar 136 as shown in FIG. 18. Stud 132 has spring loaded pins 134 on its surface (only one of which is visible in the figure) positioned on the opposite ends of a diameter perpendicular to the longitudinal axis of stud 132. Collar 136 is hollow and has two locking slots 138 (only one of which is visible in the figure). When the stud 132 is introduced into the bore of collar 136, the pins 134 are forced radially inwardly until the pins 134 are aligned with slots 138 at which time the springs (not shown) move the pins 134 to their extended position as shown in FIG. 17. The stud 132 is turned as it is advanced so that pins 134 follow the slots 138. A final twist places the pins 134 in the locking portions 140 of slots 138 behind lobes 142 which prevents the accidental separation of stud 132 and collar 136.

Figure 16:
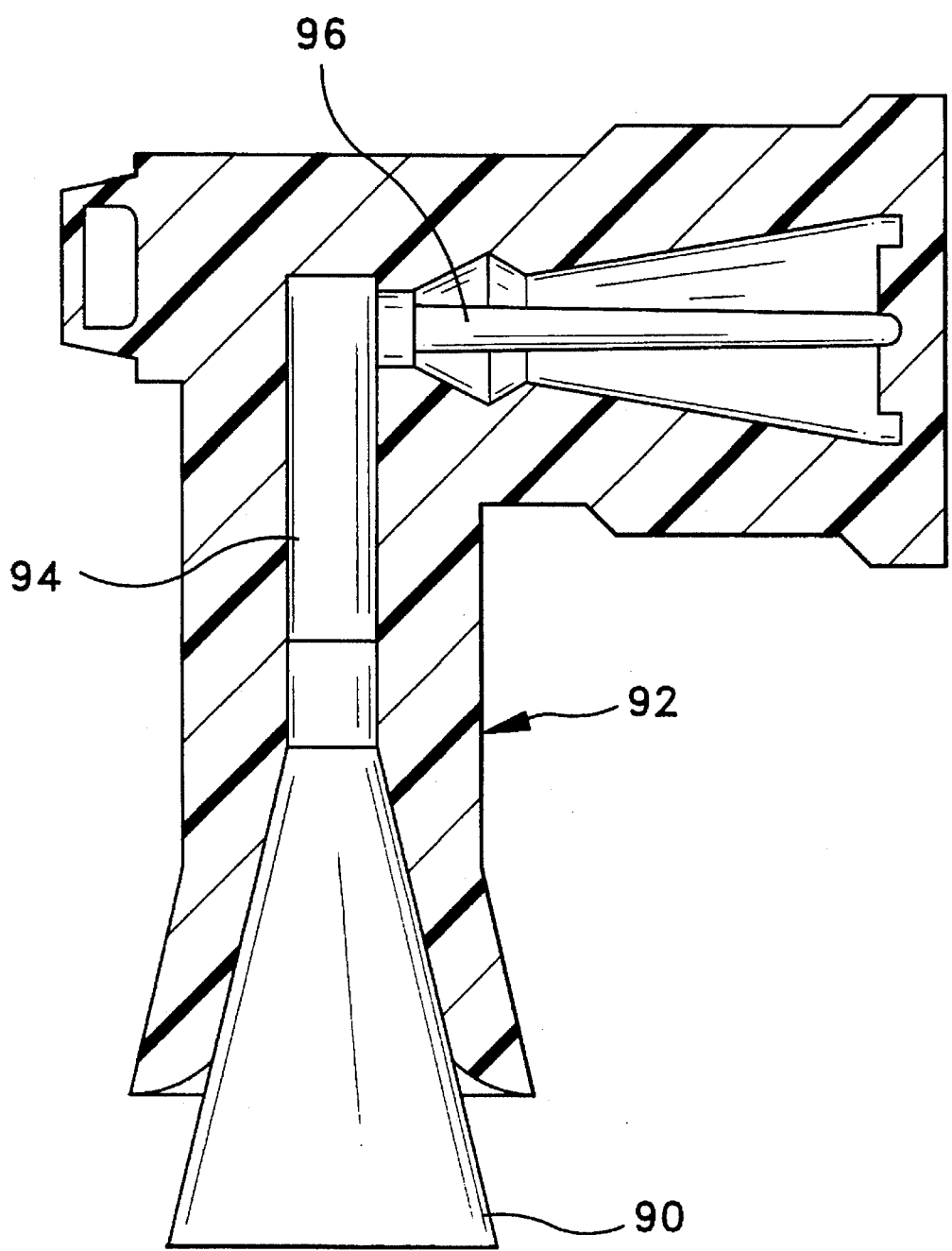
FIG. 16 is a side elevational view of a further form of mandrel to be retained in the cable bore of an elbow.

FIG. 16 shows a mandrel 90 which can be held in the cable bore of an elbow 92. Mandrel 90 has an extension 94 having an internally threaded bore at its free end. The externally threaded end of the male probe 96 can then be threaded into the internally threaded bore of the extension 94 to retain mandrel 90 the same way as a cable would be retained in its bore in an elbow 92.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. A device for expanding the bore of a recoverable member comprising:

a) mandrel means having a first end of a first diameter and a second end of a second diameter larger than said first diameter with a tapered exterior surface between said first end and said second end;

b) said mandrel means having an interior bore from said first end to said second end to increase the diameter of said bore of said recoverable member when said mandrel means is placed in said bore of said recoverable member;

c) and locking means for fixing said mandrel means to said recoverable means to maintain said recoverable means bore in its increased diameter state;

d) said locking means when released permitting said recoverable member bore to return to its original dimensions ejecting said mandrel means from said recoverable member.

2. A device as set forth in claim 1, wherein said interior bore of said mandrel is cylindrical.

3. A device as set forth in claim 1 wherein said interior bore of said mandrel has tapered sides paralleling said tapered exterior.

4. A device as set forth in claim 1, wherein said mandrel is a single unitary member.

5. A device as set forth in claim 1 wherein said mandrel is comprised of two parts which can be locked together for use and separated to permit removal.

6. A device as set forth in claim 1 wherein said locking means is a band.

7. A device as set forth in claim 1, wherein said locking means is a harness.

8. A device as set forth in claim 1 wherein said locking means comprises:

a) an inner band to engage the walls which define the end of said bore in said recoverable member;

b) an outer band to engage the outside surface of said recoverable member, and c) clamping means to hold said first band and second band in place upon a portion of said recoverable member placed between them.

9. A device as set forth in claim 1, wherein said mandrel means comprises:

a) first mandrel means having a first end of a first diameter and a second end of a second diameter larger than said first diameter with a tapered exterior surface between said first end and said second end;

b) second mandrel means having a third end of said first diameter and a fourth end of said second diameter with a tapered exterior surface between said third end and said fourth end; said first end and said third ends facing one another;

c) said locking means joining said first and third ends to retain both said first and said second mandrel means in said bore of said recoverable member.

10. A device as set forth in claim 9, wherein said locking means comprises:

a) an externally threaded stud on one of said first and third ends; and b) and internally threaded stud on the other of said first and third ends, to threadable engage said threaded stud and fix said first mandrel with respect to said second mandrel within said bore.

11. A device as set forth in claim 9, wherein said locking means comprises:

a) a twist lock member on one of said first and third ends; and b) a twist lock socket on the other of said first and third ends to twistably engage said twist lock member and fix said first mandrel with respect to said second mandrel within said bore.

12. A device as set forth in claim 1 wherein said locking means comprising:
 a) an extension on said first end having a distal end;
 b) an internally threaded aperture adjacent said distal end; said internally threaded aperture receiving therein the externally threaded end of male probe to fix said mandrel in the bore of a removable member.

* * * * *